(12) United States Patent
Shimizu et al.

(10) Patent No.: US 8,587,930 B2
(45) Date of Patent: Nov. 19, 2013

(54) GAS-INSULATED BUS

(75) Inventors: Yoshinori Shimizu, Chiyoda-ku (JP);
Hitoshi Sadakuni, Chiyoda-ku (JP);
Masato Kawahigashi, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 165 days.

(21) Appl. No.: 13/377,035

(22) PCT Filed: Jul. 17, 2009

(86) PCT No.: PCT/JP2009/062973
§ 371 (c)(1),
(2), (4) Date: Dec. 8, 2011

(87) PCT Pub. No.: WO2011/007446
PCT Pub. Date: Jan. 20, 2011

(65) Prior Publication Data
US 2012/0103645 A1    May 3, 2012

(51) Int. Cl.
*H02B 1/20*        (2006.01)
(52) U.S. Cl.
USPC ........... 361/612; 361/618; 174/28; 174/140 R
(58) Field of Classification Search
USPC ................. 361/604, 612, 618; 174/28, 140 R
See application file for complete search history.

(56) References Cited

U.S. PATENT DOCUMENTS

| | | | | |
|---|---|---|---|---|
| 3,324,272 A | * | 6/1967 | Shankle et al. | 200/305 |
| 3,356,785 A | * | 12/1967 | Yoshida et al. | 174/28 |
| 3,652,778 A | * | 3/1972 | Sakai | 174/28 |
| 3,801,725 A | * | 4/1974 | Farish | 174/28 |
| 3,829,707 A | * | 8/1974 | Pflanz | 307/147 |
| 3,962,609 A | * | 6/1976 | Chaudhuri | 361/836 |
| 4,074,064 A | * | 2/1978 | Muller et al. | 174/28 |
| 4,328,391 A | | 5/1982 | Cookson | |
| 4,338,483 A | * | 7/1982 | Euvrard et al. | 174/28 |

(Continued)

FOREIGN PATENT DOCUMENTS

| | | |
|---|---|---|
| JP | 48-058981 U | 7/1973 |
| JP | 57-129118 A | 8/1982 |
| JP | 59-175320 A | 10/1984 |
| JP | 2008-271744 A | 11/2008 |

OTHER PUBLICATIONS

International Search Report (PCT/ISA/210) issued on Aug. 18, 2009, by Japanese Patent Office as the International Searching Authority for International Application No. PCT/JP2009/062973.

*Primary Examiner* — Robert J Hoffberg
(74) *Attorney, Agent, or Firm* — Buchanan Ingersoll & Rooney PC (57) ABSTRACT

Gas-insulated bus is provided with: current-carrying conductor disposed along axial direction of metallic container that is filled with insulating-gas; shield fitting through which passes current-carrying conductor and that has depressed portion formed on portion of barrel-shaped outer surface; insulating support that has second end thereof fixed in depressed portion of shield fitting and has first end thereof fixed to metallic-container, and that supports current-carrying conductor via shield fitting; internal conductor being implanted in second end of insulating support and being, along with second end, positioned in depressed portion and fixed to shield fitting; and contact being attached to inner surface of shield fitting, being disposed in space formed on inside of shield fitting, and that makes contact with current-carrying conductor so as to maintain shield fitting and current-carrying conductor at same electric potential, wherein internal conductor has such shape that internal conductor and shield fitting together form barrel-like profile.

15 Claims, 11 Drawing Sheets

(56) References Cited

U.S. PATENT DOCUMENTS

| | | | |
|---|---|---|---|
| 4,564,721 A | * | 1/1986 | Ishikawa et al. ................. 174/10 |
| 4,818,825 A | * | 4/1989 | Ishikawa et al. ............... 174/212 |
| 5,571,990 A | * | 11/1996 | Pham et al. ..................... 174/24 |
| 6,002,084 A | * | 12/1999 | Leijon et al. ................. 174/21 R |
| 6,002,085 A | * | 12/1999 | Utsumi et al. .................. 174/28 |
| 6,081,729 A | * | 6/2000 | Bauerschmidt et al. ....... 455/523 |
| 6,624,352 B2 | * | 9/2003 | Salge et al. ..................... 174/28 |
| 2010/0165549 A1 | * | 7/2010 | Hama et al. ................... 361/612 |

* cited by examiner

GAS-INSULATED BUS

FIELD

The present invention relates to a gas-insulated bus in which a current-carrying conductor is supported by an insulating support inside a metallic container that is filled with an insulating gas.

BACKGROUND

In gas-insulated buses installed at electric power plants or electric power substations, a current-carrying conductor is disposed inside a metallic container that is filled with an insulating gas, and an insulating support insulatingly-supports the current-carrying conductor from the metallic container.

In a gas-insulated bus disclosed in Patent Literature 1, a cylindrical shield fitting is implanted inside an insulating spacer that serves as an insulating support for electric conductors, and an electric conductor is inserted through the shield fitting so that the electric conductor is insulatingly supported by the insulating spacer. Moreover, on the inner surface of the shield fitting, a groove is formed along the circumferential direction and a guide ring is placed in the groove in an abutting manner with the electric conductor. That makes the electric conductor and the insulating spacer to be slidable with respect to each other.

CITATION LIST

Patent Literature

Patent Literature 1: Japanese Patent Application Laid-open No. S59-175320

SUMMARY

Technical Problem

In order to maintain the insulating capacity of a gas-insulated bus, the electric fields of the components inside the metallic container need to be set equal to or smaller than a design electric field value, which is smaller than a breakdown electric field value. In a conventional gas-insulated bus as described above, in the vicinity of the cylindrical shield fitting, the electric field is greater as compared to the electric field at other locations and is close to the design electric field value. Except for that electric field, electrical tolerance is maintained with respect to the design electric field value.

In the insulating spacer, the shield fitting is implanted in an integrated manner by means of molding. Thus, it is not an easy task to install the shield fitting in the insulating spacer.

That present invention has been made to solve the above problems and it is an object of the present invention to provide a gas-insulated bus in which a shield fitting can be installed in an insulating spacer with a simple installation structure and without causing a decline in the insulating capacity.

Solution to Problem

In order to solve the aforementioned problems and attain the aforementioned object, the gas-insulated bus is provided with: a current-carrying conductor disposed along the axial direction of a metallic container that is filled with an insulating gas; a shield fitting through which passes the current-carrying conductor and that has a depressed portion formed on a portion of a barrel-shaped outer surface; an insulating support that has a first end thereof fixed in the depressed portion of the shield fitting and has a second end thereof fixed to the metallic container, and that supports the current-carrying conductor via the shield fitting; an internal conductor that is implanted in the second end of the insulating support and that, along with the second end, is positioned in the depressed portion and fixed to the shield fitting; and a contact that is attached to the inner surface of the shield fitting, that is disposed in a space formed on the inside of the shield fitting, and that makes contact with the current-carrying conductor so as to maintain the shield fitting and the current-carrying conductor at the same electric potential, wherein the internal conductor has such a shape that the internal conductor and the shield fitting together form a substantially barrel-like profile.

Advantageous Effects of Invention

According to an aspect of the present invention, an internal conductor has such a shape that the internal conductor and a shield fitting together form a substantially barrel-like profile. Hence, the electric field inside a metallic container can be maintained at a value equal to or smaller than the design electric field value and can be maintained at an almost uniform distribution. As a result, a simple configuration can be achieved without causing any decline in the insulating capacity.

Moreover, according to another aspect of the present invention, by manufacturing the shield fitting to have a substantially barrel-like profile, a space is created inside the shield fitting. By making use of that space, it becomes easier to fix the shield fitting to an insulating support.

Furthermore, according to still another aspect of the present invention, a contact is disposed in the space created on the inside of the shield fitting. As a result, a configuration for maintaining the shield fitting and a current-carrying conductor at the same electric potential can be achieved without difficulty.

DESCRIPTION OF EMBODIMENTS

Exemplary embodiments of a gas-insulated bus according to the present invention are described below in detail with reference to the accompanying drawings. The present invention is not limited to these exemplary embodiments.

First Embodiment

Figure 1:
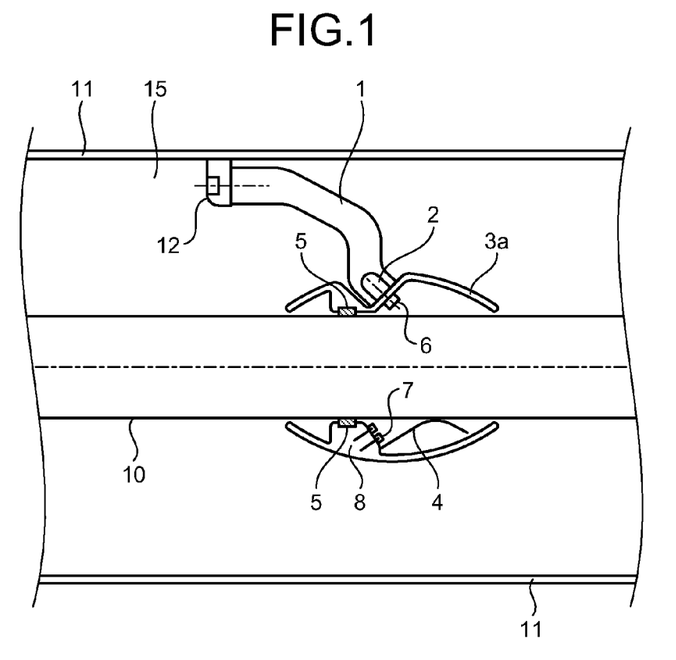
FIG. 1 is a diagram illustrating a vertical cross-sectional configuration of a gas-insulated bus according to a first embodiment and is a cross-sectional view along A-A line illustrated in FIG. 3.
Figure 2:
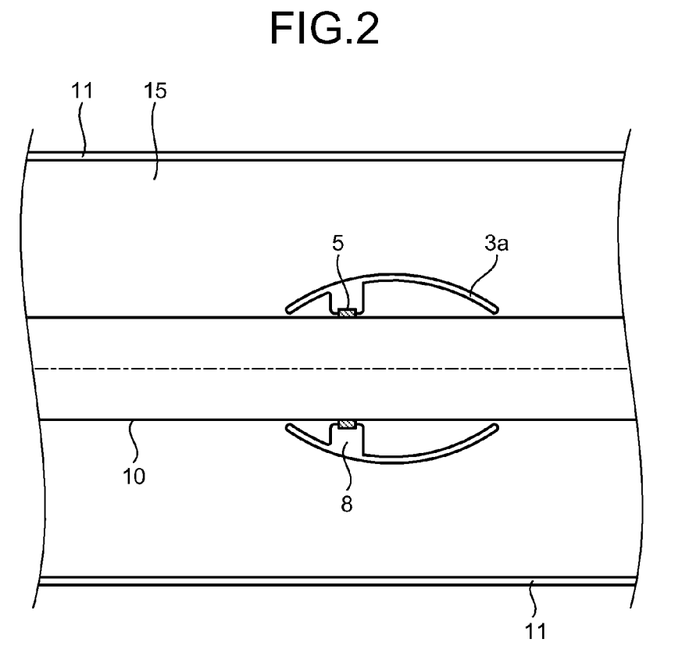
FIG. 2 is a diagram illustrating another vertical cross-sectional configuration of the gas-insulated bus according to the first embodiment and is a cross-sectional view along B-B line illustrated in FIG. 3.
Figure 3:
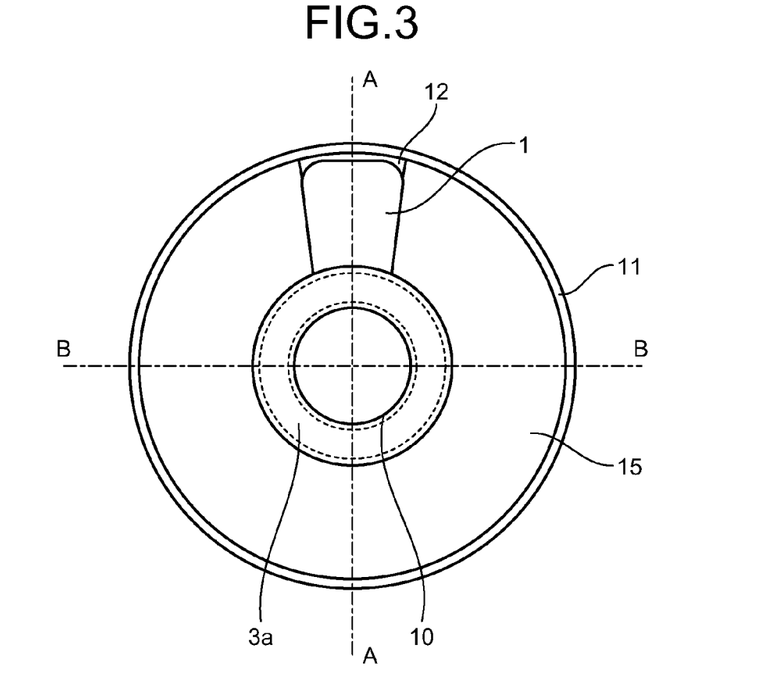
FIG. 3 is a diagram illustrating a horizontal cross-sectional configuration of the gas-insulated bus according to the first embodiment.

FIG. 1 is a diagram illustrating a vertical cross-sectional configuration of a gas-insulated bus according to a first embodiment and is a cross-sectional view along A-A line illustrated in FIG. 3. FIG. 2 is a diagram illustrating another vertical cross-sectional configuration of the gas-insulated bus according to the first embodiment and is a cross-sectional view along B-B line illustrated in FIG. 3. Herein, FIG. 3 is a diagram illustrating a horizontal cross-sectional configuration of the gas-insulated bus according to the first embodiment.

As illustrated in FIGS. 1 to 3, inside a pressure vessel 11 that is an electrically-grounded metallic container tubular in shape, a current-carrying conductor 10 is disposed along the axial direction of the pressure vessel 11. Inside the pressure vessel 11, an insulating gas 15 such as $SF_6$ (sulfur hexafluoride) is hermetically filled.

Via a shield fitting 3a that encompasses the current-carrying conductor 10 for the purpose of electric field easing, the current-carrying conductor 10 is supported by an insulating support 1 that is installed in the pressure vessel 11. That is, a first end of the insulating support 1 is fixed to a seat 12, which is installed on the inner surface of the pressure vessel 11, with fixing members such as bolts; and a second end of the insulating support 1 is fixed to the shield fitting 3a.

The shield fitting 3a is barrel-like in shape with a substantially rotational symmetry around the axis of the current-carrying conductor 10 and has a depressed portion formed on a portion of the outer surface of the barrel shape. The second end of the insulating support 1 is fixed in that depressed portion. Since, the shield fitting 3a excluding the depressed portion has a barrel-like shape, a space is formed in between the inner surface of the shield fitting 3a and the outer surface of an internal conductor 2. By making use of that space, the shield fitting 3a is fixed to the insulating support 1 with fixing members 6 such as bolts. Meanwhile, the second end of the insulating support 1, that is, that end of the insulating support 1 which is fixed to the shield fitting 3a has the internal conductor 2 made of a metallic material and implanted therein. When a fixing member 6 is passed through the shield fitting 3a from the inside of the shield fitting 3a and is threaded into a hole formed on the internal conductor 2, the shield fitting 3a gets fixed to the internal conductor 2.

Figure 4:
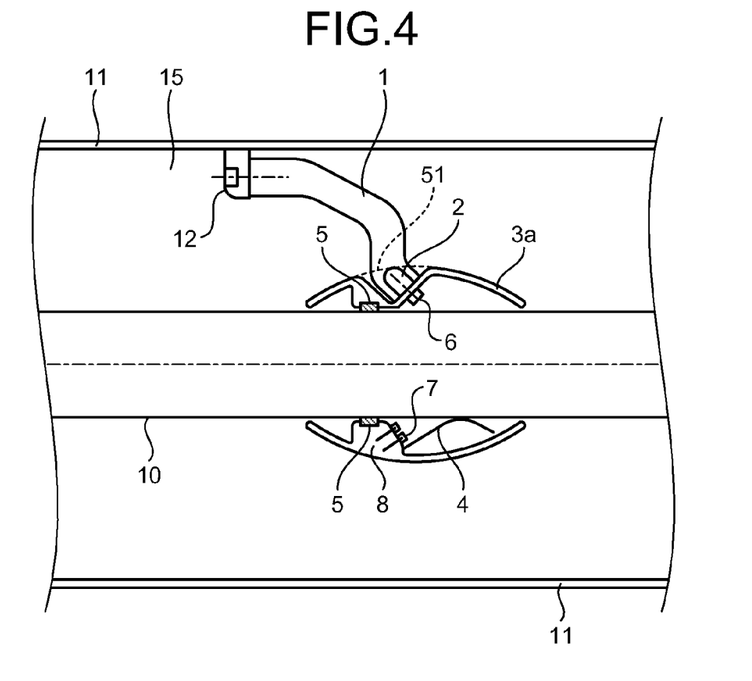
FIG. 4 is a vertical cross-sectional view for explaining the shape of an internal conductor according to the first embodiment.

In the first embodiment, the internal conductor 2 has such a shape that the internal conductor 2 and the shield fitting 3a together form a substantially barrel-like profile. That is, the outer surface of the internal conductor 2, which is disposed in the depressed portion, constitutes the barrel-like profile and is part of the entire substantially barrel-like shape in an integrated manner with the outer surface of the shield fitting 3a excluding the depressed portion. More particularly, as illustrated in FIG. 4, if a virtual surface 51 is formed by extending the outer edge of the barrel-like portion of the shield fitting 3a above the depressed portion, the outer surface of the internal conductor 2 has such a shape which almost makes contact with the virtual surface 51.

Moreover, as illustrated in FIG. 1, the cross-sectional profile of the depressed portion has a substantially L-shape that is inclined with respect to the axis line. Meanwhile, the second end of the insulating support 1 is fixed to one of the inclined surfaces of the depressed portion. Moreover, that second end is drawn in an inclined direction with respect to a surface perpendicular to the axis line.

On the inner surface of the shield fitting 3a, ring-like insulating member 5 is disposed across the circumferential direction of the current-carrying conductor 10. The insulating member 5 makes contact with the current-carrying conductor 10 and supports, through the surface of contact thereof, the current-carrying conductor 10. Herein, the surface of contact of each insulating member 5 is formed to be smooth in nature so that the current-carrying conductor 10 is made slidable with respect to the shield fitting 3a. Meanwhile, the insulating member 5 is disposed at the top of a wall 8, which is formed in a ring-like manner on the inner surface of the shield fitting 3a. Typically, the wall 8 is formed to have a constant height from the outer surface of the shield fitting 3a. However, in the vicinity of the depressed portion, the outer surface is recessed toward inside. Hence, the wall 8 decreases in height and becomes equal to the thickness of the shield fitting 3a at other places. As a result, in the vicinity of the depressed portion, the corresponding insulating member 5 is in a condition of being attached to the inner wall of the shield fitting 3a.

On the side surface of the wall 8 is attached a spring-shaped contact 4 using attaching members 7 such as bolts. The contact 4 is disposed in the space created on the inside of the shield fitting 3a in an abutting manner with the current-carrying conductor 10. Herein, the contact 4 remains biased to the current-carrying conductor 10 so as to ensure that the shield fitting 3a makes contact with the current-carrying conductor 10 via the contact 4. As a result, the shield fitting 3a and the current-carrying conductor 10 are maintained at the same electric potential.

Figure 21:
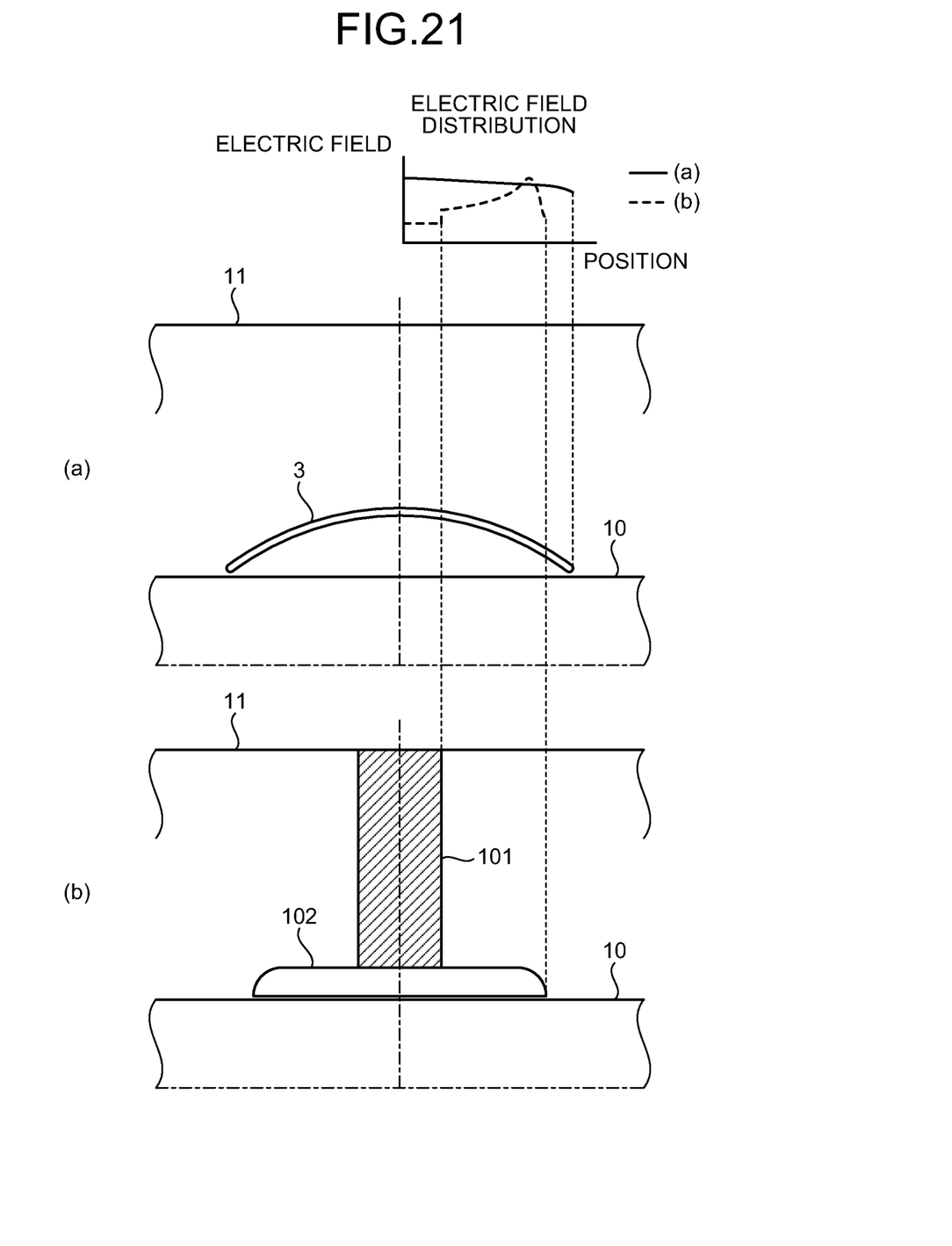
FIG. 21 is a diagram in which the electric field distribution inside a pressure vessel is illustrated for a configuration (a) according to the first embodiment and for a conventional configuration (b).

Explained below are the operations according to the first embodiment. When a voltage is applied to the current-carrying conductor 10, an electric field is generated inside the pressure vessel 11. FIG. 21 is a diagram in which the electric field distribution inside the pressure vessel 11 is illustrated for a configuration (a) according to the first embodiment and for a conventional configuration (b).

In FIG. 21, (a) represents a schematic illustration of the pressure vessel 11, a barrel-shaped shield fitting 3, and the current-carrying conductor 10 as the configuration according to the first embodiment; and (b) represents a schematic illustration of the pressure vessel 11, an insulating spacer 101, a cylindrical shield fitting 102, and the current-carrying conductor 10 as the configuration of a conventional gas-insulated bus. Meanwhile, the shield fitting 3 is a schematic illustration of a substantially barrel-like shape formed when the shield fitting 3a and the internal conductor 2 are combined together.

At the upper right in FIG. 21, the electric field distribution inside the pressure vessel 11 is illustrated with respect to (a) as well as (b), with the horizontal axis representing positions in the axial direction and the vertical axis representing electric field values. As illustrated in FIG. 21, in the conventional case, the electric field goes on increasing from the center toward the end and reaches the peak in the vicinity of the end of the cylindrical shield fitting 102 (see (b)). That happens because of a smaller curvature at the end of the cylindrical shield fitting 102. In contrast, in the case of the first embodiment, the shield fitting 3 has a substantially barrel-like shape, which overall has only gradual changes. Hence, the electric field distribution is almost uniform with respect to the axial direction (see (a)). Moreover, the electric field value in (a) is equivalent to the peak value in the conventional case. Thus, in the first embodiment, although the average value of the electric field is higher as compared to the conventional case, it is possible to achieve a uniform electric field distribution on the whole within the acceptable range equal to or smaller than the design electric field value.

Meanwhile, in FIG. 4, the outer surface of the internal conductor 2 is illustrated to almost abut against the virtual surface 51. However, as long as the shape of the internal conductor 2 is such that the outer surface thereof lies within the area of a predetermined width from the virtual surface 51, then it is possible to achieve the same advantages as achieved in the case when the outer surface makes contact with the virtual surface 51. In terms of the distance in the perpendicular direction from the axis line, the predetermined area can be, for example, within a range of ±30%; or can be favorably within a range of ±10%. For example, even if the outer surface of the internal conductor 2 lies on the outside of the virtual surface 51 with reference to the axis line, it is an acceptable case as long as the portion lying on the outside is not of the size that may hinder in a major way the uniformity of electric field distribution.

As described above, according to the first embodiment, the internal conductor 2 is shaped in such a way that the entire profile of the internal conductor 2 and the shield fitting 3a when viewed as a unit has a substantially barrel-like shape. That makes it possible to achieve an advantage that the electric field inside the pressure vessel 11 can be maintained at an almost uniform distribution and can be easily maintained at a value equal to or smaller than the design electric field value. As a result, a simple configuration can be achieved without causing any decline in the insulating capacity.

Moreover, in the first embodiment, the shield fitting 3a can be manufacture by, for example, doing bending work on a metal plate, which then can be fixed to the insulating support 1 with the fixing member 6. Hence, the manufacturing process is simplified as compared to the conventional technique of implanting a shield fitting inside an insulating support in an integrated manner. Furthermore, by taking into account the shape on the basis of the virtual surface 51, it becomes easier to decide the shape of the internal conductor 2.

Moreover, in the first embodiment, by manufacturing the shield fitting 3a to have a substantially barrel-like profile, a space is created inside the shield fitting 3a and the fixing member 6 is disposed inside that space. That simplifies the task of fixing the shield fitting 3a to the insulating support 1. That is, the installation structure of the shield fitting 3a becomes simple thereby enabling the use of bolts or the like to fix the shield fitting 3a to the insulating support 1. In this way, according to the first embodiment, by implementing such a shape that enables extensive approximation of the electric field distribution inside the pressure vessel 11 to the design electric field value, it becomes possible to secure an internal space in the shield fitting 3a. Hence, even in a limited space inside the pressure vessel 11, a simple installation structure for installing the shield fitting 3a can be achieved without causing any decline in the insulating capacity.

Furthermore, in the first embodiment, by disposing the contact 4 in the space created on the inside of the shield fitting 3a, the shield fitting 3a and the current-carrying conductor 10 can be maintained at the same electric potential with a simple configuration. Herein, the shield fitting 3a and the current-carrying conductor 10 need to be maintained at the same electric potential so as to prevent any decline in the insulating capacity.

Moreover, in the first embodiment, on the inner surface of the shield fitting 3a is disposed the insulating member 5, which provide slidable surfaces of contact with respect to the current-carrying conductor 10. Thus, even in case the current-carrying conductor 10 undergoes expansion or contraction due to temperature changes, the contacting-supporting portion can be moved smoothly thereby enabling cancelling of the stress caused by expansion or contraction. Besides, since it is possible to avoid a situation in which metallic powder is formed due to the friction at the surfaces of contact, it also becomes possible to avoid an insulation breakdown that may occur due to the movement of the metallic powder.

Furthermore, in the first embodiment, the cross-sectional profile of the depressed portion has a substantially L-shape. However, alternatively, any other shape can be applied as long as the shape is suitable in fixing the shield fitting 3a to the internal conductor 2.

Second Embodiment

Figure 5:
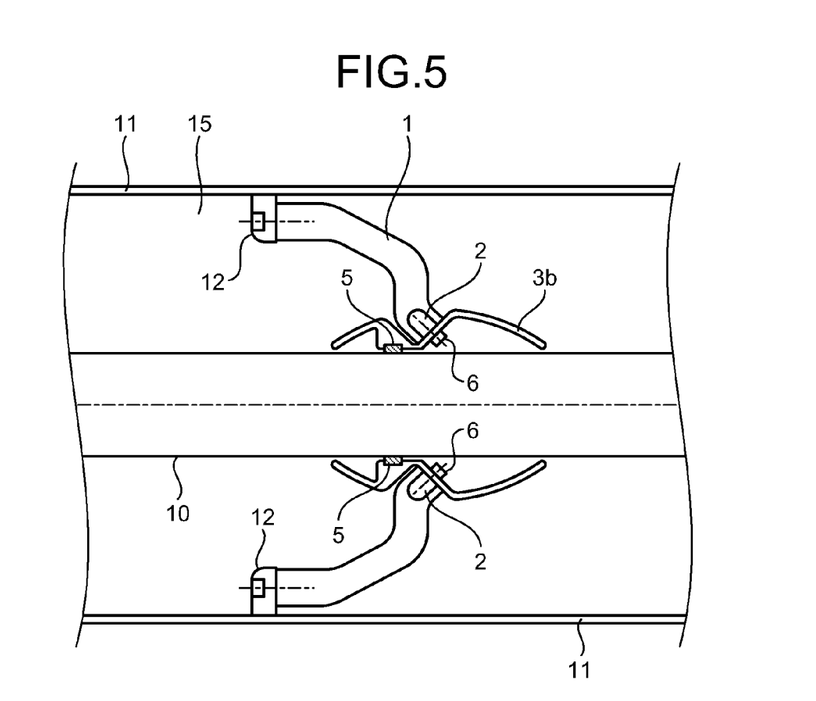
FIG. 5 is a diagram illustrating a vertical cross-sectional configuration of a gas-insulated bus according to a second embodiment and is a cross-sectional view along B-B line illustrated in FIG. 7.
Figure 6:
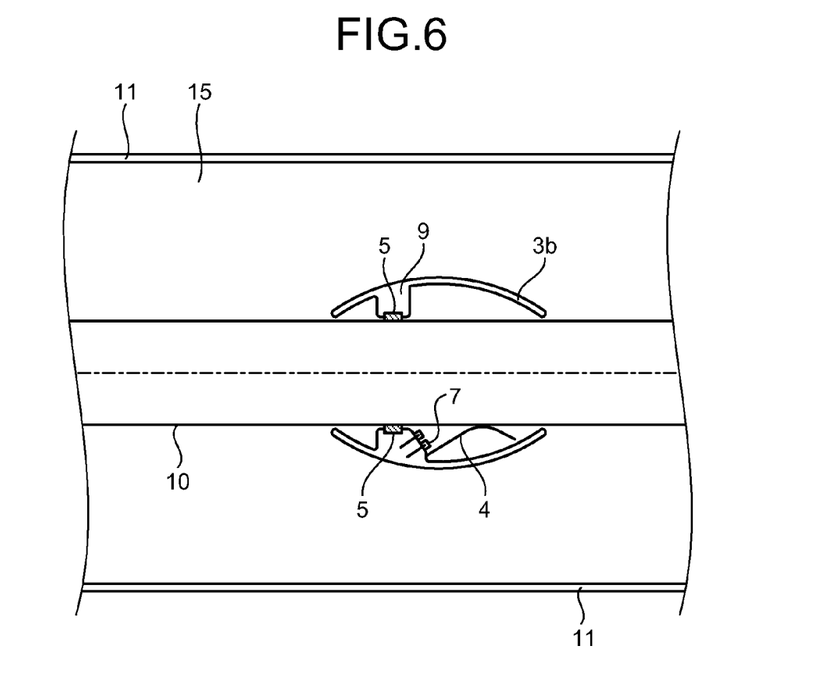
FIG. 6 is a diagram illustrating another vertical cross-sectional configuration of the gas-insulated bus according to the second embodiment and is a cross-sectional view along A-A line illustrated in FIG. 7.
Figure 7:
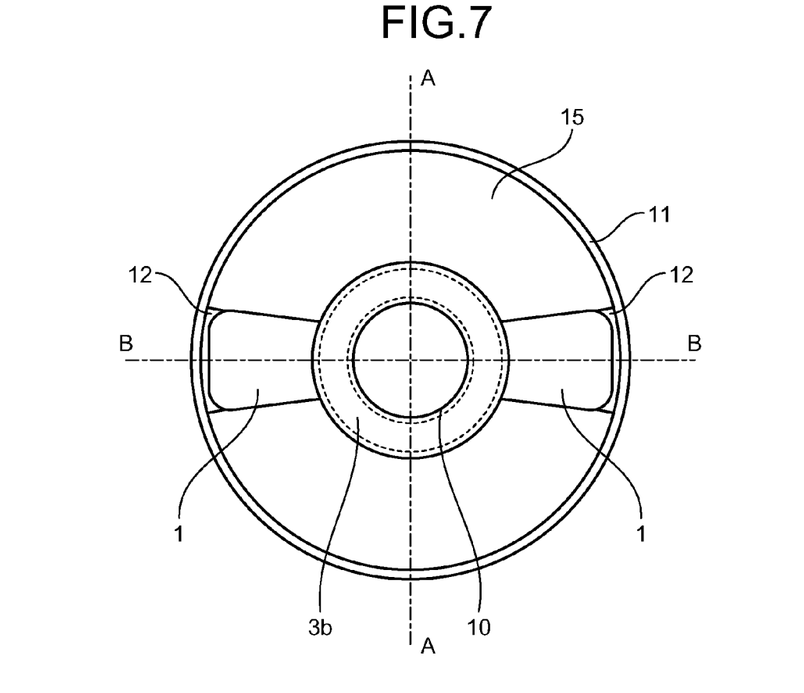
FIG. 7 is a diagram illustrating a horizontal cross-sectional configuration of the gas-insulated bus according to the second embodiment.

FIG. 5 is a diagram illustrating a vertical cross-sectional configuration of a gas-insulated bus according to a second embodiment and is a cross-sectional view along B-B line illustrated in FIG. 7. FIG. 6 is a diagram illustrating another vertical cross-sectional configuration of the gas-insulated bus according to the second embodiment and is a cross-sectional view along A-A line illustrated in FIG. 7. Herein, FIG. 7 is a diagram illustrating a horizontal cross-sectional configuration of the gas-insulated bus according to the second embodiment.

As illustrated in FIGS. 5 to 7, in the second embodiment, a shield fitting 3b is installed that has depressed portions formed at two positions on the outer surface of the barrel shape which encompasses the current-carrying conductor 10. Thus, through the two depressed portions formed on the shield fitting 3b, the current-carrying conductor 10 is supported by two insulating supports 1.

Each depressed portion has the same shape as the shape described in the first embodiment. Herein, the two depressed portions are formed, for example, at an angle of 180° around the axis line (see FIG. 7). Accordingly, the two insulating supports 1 lie on a B-B plane.

Moreover, in an identical manner to the first embodiment, that end of each insulating support 1 which is fixed to the shield fitting 3b has the internal conductor 2 implanted therein. Each internal conductor 2 is disposed in the corresponding depressed portion. Besides, the outer surface of each internal conductor 2 constitutes the barrel-like profile and is part of the entire substantially barrel-like shape in an integrated manner with the outer surface of the shield fitting 3b excluding the depressed portions.

The insulating member 5 is disposed at the top of a wall 9, which is formed in a ring-like manner on the inner surface of the shield fitting 3b. On the side surface of the wall 9 is attached the spring-shaped contact 4. The contact 4 is disposed in the space created on the inside of the shield fitting 3b in an abutting manner with the current-carrying conductor 10. Consequently, the shield fitting 3b and the current-carrying conductor 10 are maintained at the same electric potential.

In the second embodiment, the rest of the configuration is identical to the configuration according to the first embodiment. In FIGS. 5 to 7, the constituent elements identical to the constituent elements illustrated in FIGS. 1 to 3 are referred to by the same reference numerals and the explanation of such constituent elements is not repeated. Moreover, the electric field distribution according to the second embodiment is also identical to the electric field distribution illustrated in FIG. 21. Thus, according to the second embodiment, it is possible to achieve the same advantages as the advantages achieved in the first embodiment. Besides, since two insulating supports 1 are disposed in the configuration according to the second embodiment, the support gets enhanced in strength.

Third Embodiment

Figure 8:
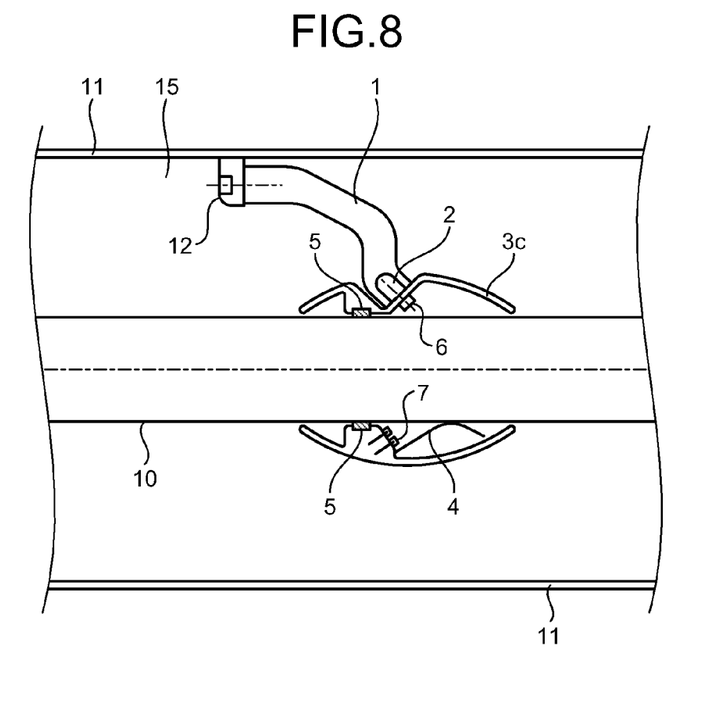
FIG. 8 is a diagram illustrating a vertical cross-sectional configuration of a gas-insulated bus according to a third embodiment and is a cross-sectional view along A-A line illustrated in FIG. 10.
Figure 9:
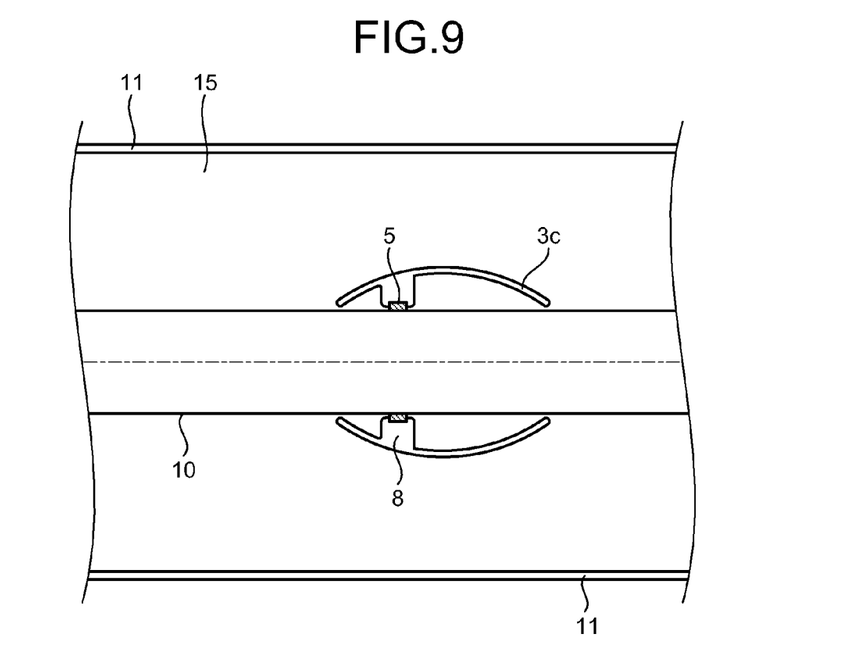
FIG. 9 is a diagram illustrating another vertical cross-sectional configuration of the gas-insulated bus according to the third embodiment and is a cross-sectional view along B-B line illustrated in FIG. 10.
Figure 10:
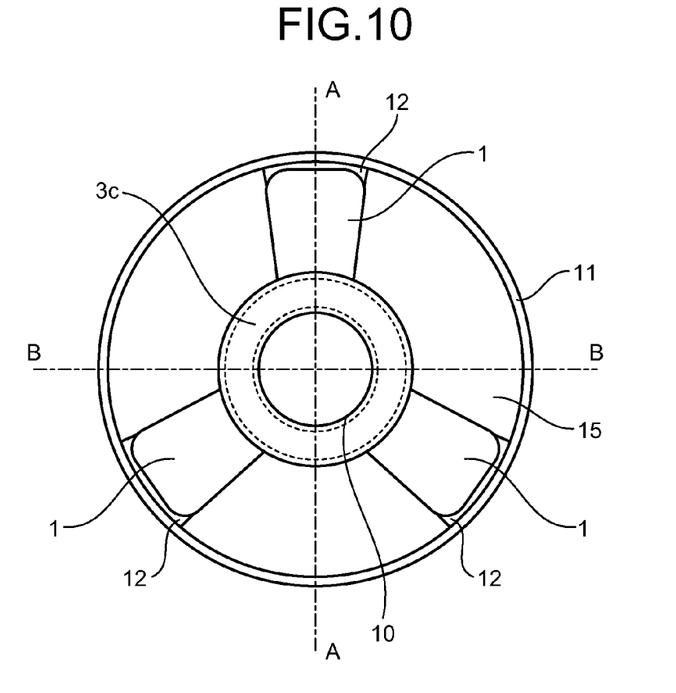
FIG. 10 is a diagram illustrating a horizontal cross-sectional configuration of the gas-insulated bus according to the third embodiment.

FIG. 8 is a diagram illustrating a vertical cross-sectional configuration of a gas-insulated bus according to a third embodiment and is a cross-sectional view along A-A line illustrated in FIG. 10. FIG. 9 is a diagram illustrating another vertical cross-sectional configuration of the gas-insulated bus according to the third embodiment and is a cross-sectional view along B-B line illustrated in FIG. 10. Herein, FIG. 10 is a diagram illustrating a horizontal cross-sectional configuration of the gas-insulated bus according to the third embodiment.

As illustrated in FIGS. 8 to 10, in the third embodiment, a shield fitting 3c is installed that has depressed portions formed at three positions on the outer surface of the barrel shape which encompasses the current-carrying conductor 10. Thus, through the three depressed portions formed on the shield fitting 3c, the current-carrying conductor 10 is supported by three insulating supports 1.

Each depressed portion has the same shape as the shape described in the first embodiment. Herein, the three depressed portions are formed, for example, at an angle of 120° from each other around the axis line (see FIG. 10).

Moreover, in an identical manner to the first embodiment, that end of each insulating support 1 which is fixed to the shield fitting 3c has the internal conductor 2 implanted therein. Each internal conductor 2 is disposed in the corresponding depressed portion. Besides, the outer surface of each internal conductor 2 constitutes the barrel-like profile and is part of the entire substantially barrel-like shape in an integrated manner with the outer surface of the shield fitting 3c excluding the depressed portions.

In the third embodiment, the rest of the configuration is identical to the configurations according to the first and second embodiments. In FIGS. 8 to 10, the constituent elements identical to the constituent elements illustrated in FIGS. 1 to 3 are referred to by the same reference numerals and the explanation of such constituent elements is not repeated. Moreover, the electric field distribution according to the third embodiment is also identical to the electric field distribution illustrated in FIG. 21. Thus, according to the third embodiment, it is possible to achieve the same advantages as those achieved in the first embodiment. Besides, since three insulating supports 1 are disposed in the configuration according to the third embodiment, the support is further enhanced in strength than the second embodiment. Meanwhile, it is also possible to further increase the number of insulating supports 1.

Fourth Embodiment

Figure 11:
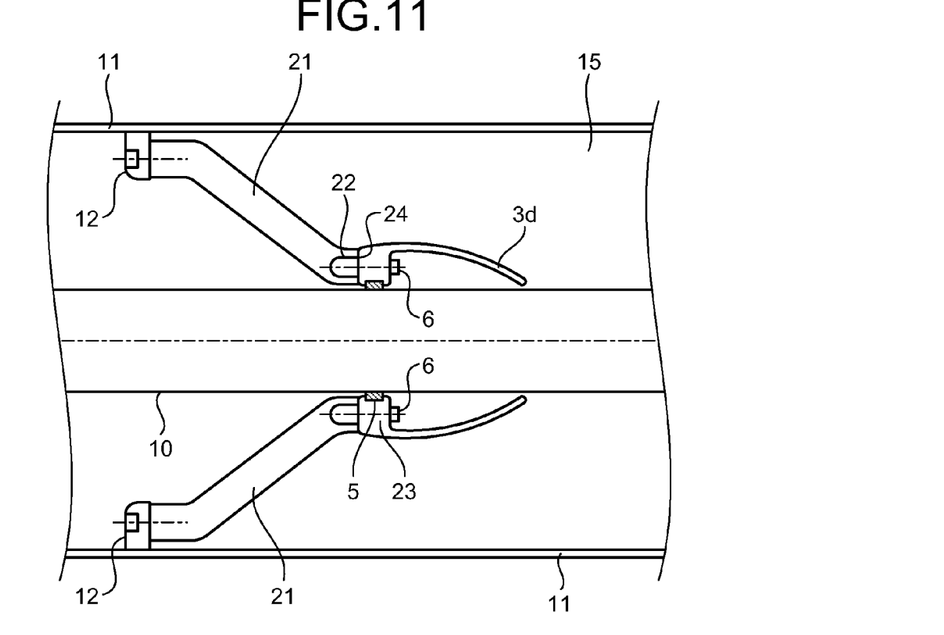
FIG. 11 is a diagram illustrating a vertical cross-sectional configuration of a gas-insulated bus according to a fourth embodiment and is a cross-sectional view along B-B line illustrated in FIG. 13.
Figure 12:
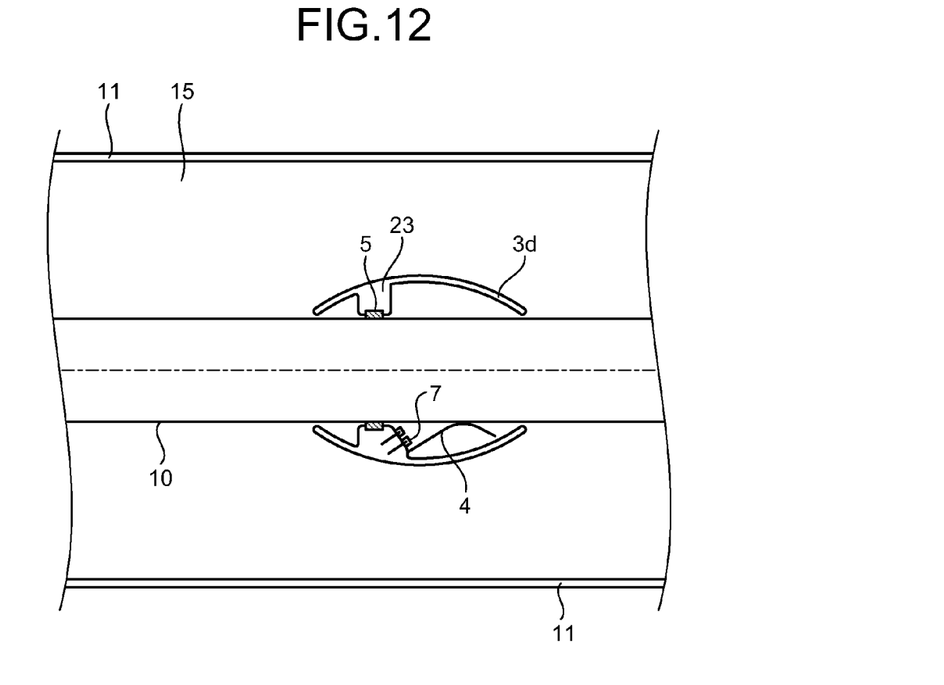
FIG. 12 is a diagram illustrating another vertical cross-sectional configuration of the gas-insulated bus according to the fourth embodiment and is a cross-sectional view along A-A line illustrated in FIG. 13.
Figure 13:
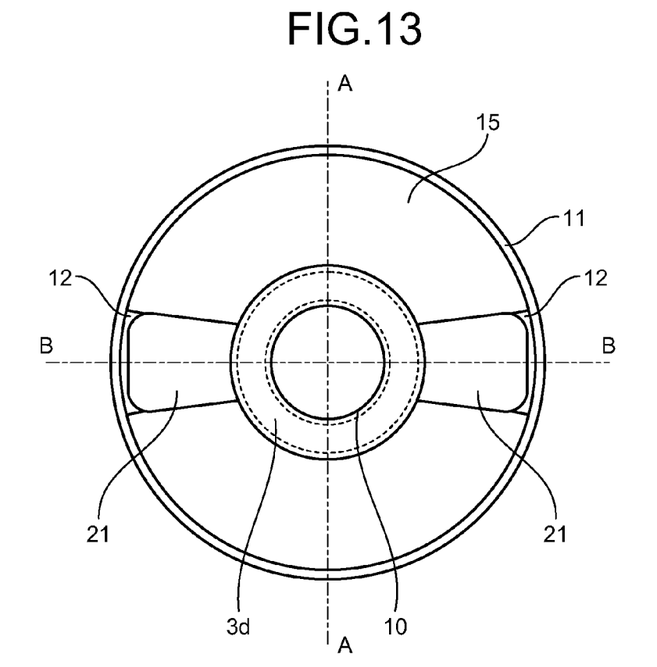
FIG. 13 is a diagram illustrating a horizontal cross-sectional configuration of the gas-insulated bus according to the fourth embodiment.

FIG. 11 is a diagram illustrating a vertical cross-sectional configuration of a gas-insulated bus according to a fourth embodiment and is a cross-sectional view along B-B line illustrated in FIG. 13. FIG. 12 is a diagram illustrating another vertical cross-sectional configuration of the gas-insulated bus according to the fourth embodiment and is a cross-sectional view along A-A line illustrated in FIG. 13. Herein, FIG. 13 is a diagram illustrating a horizontal cross-sectional configuration of the gas-insulated bus according to the fourth embodiment.

As illustrated in FIGS. 11 to 13, in the fourth embodiment, a shield fitting 3d is installed that has notches formed at two positions on the outer surface of the barrel shape which encompasses the current-carrying conductor 10. Thus, through the two notches formed on the shield fitting 3d, the current-carrying conductor 10 is supported by two insulating supports 21.

A first end of each insulating support 21 is fixed to the corresponding seat 12, which is installed on the inner surface of the pressure vessel 11, with fixing members such as bolts; and a second end of that insulating support 21 is fixed to the shield fitting 3d. More particularly, at two positions on one end of the barrel-shaped shield fitting 3d are formed notches, through which the second ends of the insulating supports 21 are inserted into the shield fitting 3d and are fixed using the fixing members 6 to a side surface 24 of a wall 23 that is erected in a ring-like manner along the circumferential direction on the inner surface of the shield fitting 3d. The side surface 24 is substantially perpendicular to the axis line so that the second ends of the insulating supports 21, which are fixed to the side surface 24, are drawn parallel to the direction of the axis line from the respective notches.

The two insulating supports 21 are disposed, for example, at an angle of 180° around the axis line. Accordingly, the two insulating supports 21 lie on a B-B plane.

Figure 14:
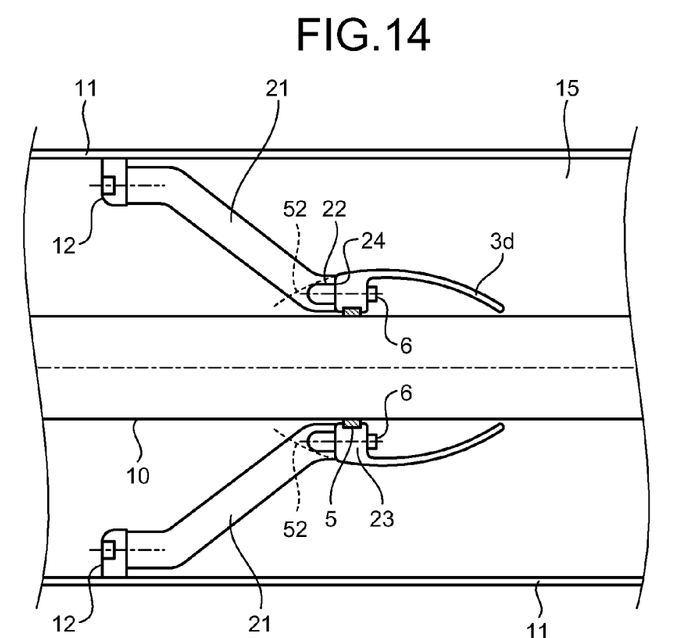
FIG. 14 is a vertical cross-sectional view for explaining the shape of an internal conductor according to the fourth embodiment.

Herein, the second end of each insulating support 21 has an internal conductor 22 implanted therein. Each internal conductor 22 is disposed in the corresponding notch. Besides, the outer surface of each internal conductor 22 constitutes the barrel-like profile and is part of the entire substantially barrel-like shape in an integrated manner with the outer surface of the shield fitting 3d excluding the notches. More particularly, as illustrated in FIG. 14, if a virtual surface 52 is formed by extending the outer edge of the barrel-like portion of the shield fitting 3d above the notched portions, the outer surfaces of each internal conductor 22 has such a shape which almost makes contact with the corresponding virtual surface 52.

The insulating member 5 is disposed at the top of the wall 23. Herein, in an identical manner to the first embodiment, the insulating members 5 provide slidable surfaces of contact with respect to the current-carrying conductor 10. Moreover, on the side surface of the wall 23 is attached the spring-shaped contact 4, which is disposed in the space created on the inside of the shield fitting 3d and which makes contact with the current-carrying conductor 10. Consequently, the shield fitting 3d and the current-carrying conductor 10 are maintained at the same electric potential.

In this way, the fourth embodiment differs from the first embodiment in the fact that it is the notches through which the insulating supports 21 are fixed to the shield fitting 3d. Thus, in the fourth embodiment, the explanation is given about the shape and installation structure of the insulating supports 21 that are different from the insulating support in the first embodiment.

In the fourth embodiment, the rest of the configuration is identical to the configuration according to the first embodiment. In FIGS. 11 to 13, the constituent elements identical to the constituent elements illustrated in FIGS. 1 to 3 are referred to by the same reference numerals and the explanation of such constituent elements is not repeated. Moreover, the electric field distribution according to the fourth embodiment is also identical to the electric field distribution illustrated in FIG. 21.

In the fourth embodiment, the internal conductors 22 are shaped in such a way that the entire profile of the internal conductors 22 and the shield fitting 3d when viewed as a unit is substantially barrel-like in shape. That makes it possible to achieve an advantage that the electric field inside the pressure vessel can be maintained at an almost uniform distribution. Apart from that, the other advantages achieved in the fourth embodiment are identical to the advantages achieved in the first embodiment.

Fifth Embodiment

Figure 15:
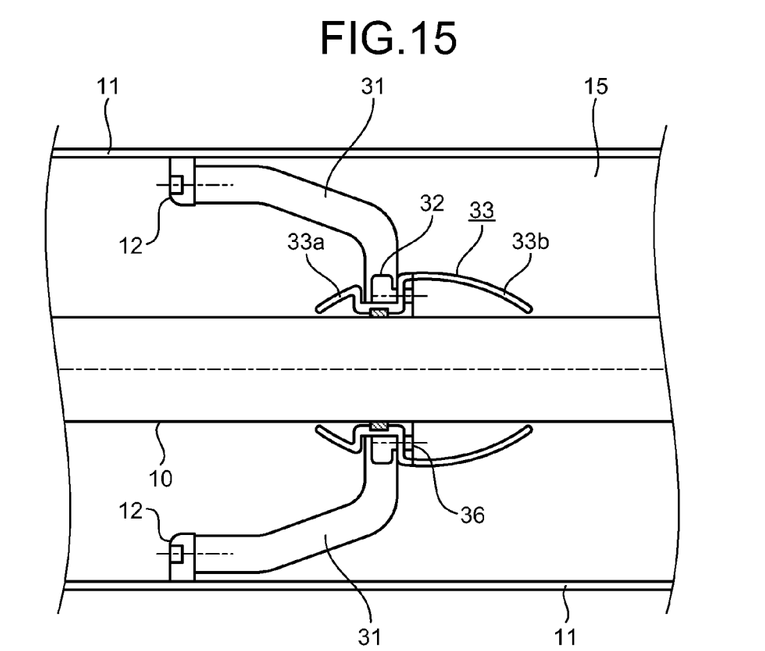
FIG. 15 is a diagram illustrating a vertical cross-sectional configuration of a gas-insulated bus according to a fifth embodiment and is a cross-sectional view along B-B line illustrated in FIG. 17.
Figure 16:
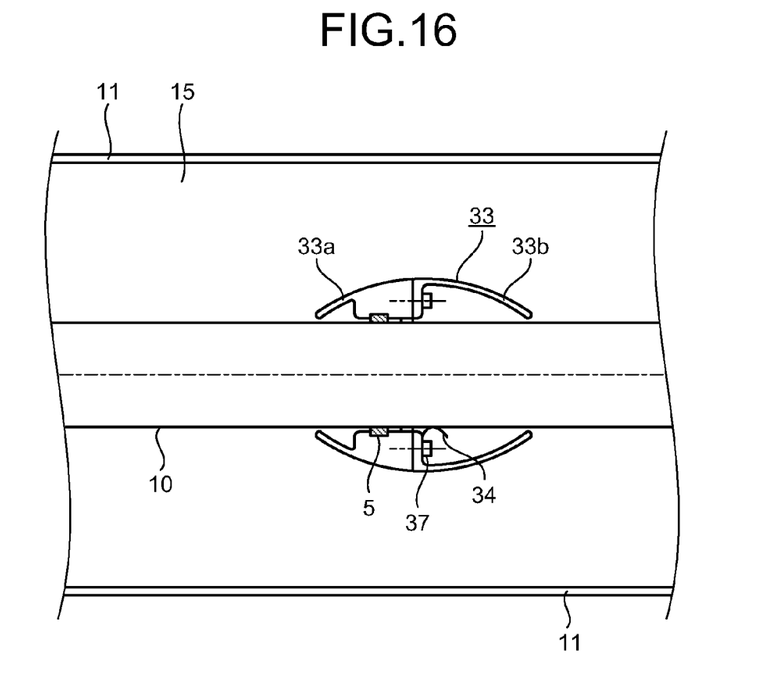
FIG. 16 is a diagram illustrating another vertical cross-sectional configuration of the gas-insulated bus according to the fifth embodiment and is a cross-sectional view along A-A line illustrated in FIG. 17.
Figure 17:
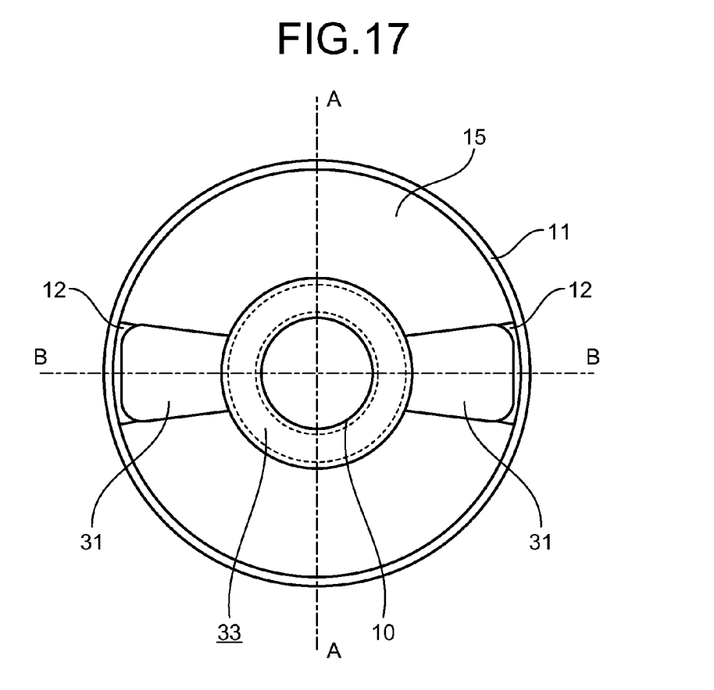
FIG. 17 is a diagram illustrating a horizontal cross-sectional configuration of the gas-insulated bus according to the fifth embodiment.

FIG. 15 is a diagram illustrating a vertical cross-sectional configuration of a gas-insulated bus according to a fifth embodiment and is a cross-sectional view along B-B line illustrated in FIG. 17. FIG. 16 is a diagram illustrating another vertical cross-sectional configuration of the gas-insulated bus according to the fifth embodiment and is a cross-sectional view along A-A line illustrated in FIG. 17. Herein, FIG. 17 is a diagram illustrating a horizontal cross-sectional configuration of the gas-insulated bus according to the fifth embodiment.

As illustrated in FIGS. 15 to 17, in the fifth embodiment, a shield fitting 33 is installed that has depressed portions formed at two positions on the outer surface of the barrel shape which encompasses the current-carrying conductor 10.

The shield fitting 33 has, for example, two component members. More particularly the shield fitting 33 is configured by coupling a shield member 33a and a shield member 33b that are made of a metallic material. The two depressed portions are formed on the shield member 33a. Meanwhile, the shield member 33a and the shield member 33b are coupled together by fastening with, for example, a fixing member 37 such as a bolt.

In the fifth embodiment, through the two depressed portions, the current-carrying conductor 10 is supported by two insulating supports 31. A first end of each insulating support 31 is fixed to the seat 12, which is installed on the inner surface of the pressure vessel 11, with fixing members such as bolts; and a second end of each insulating support 31 is fixed to the shield fitting 33. More particularly, the second end of each insulating support 31 has an internal conductor 32 implanted therein. Each internal conductor 32 is disposed in the corresponding depressed portion. Besides, the shield member 33a is fixed to the second end of the corresponding insulating support 31 with a fixing member 36 such as a bolt. More particularly, in order to fix the shield member 33a to the corresponding insulating support 31; the fixing member 36 is passed through a hole, which is formed on the side surface of the shield member 33a facing the shield member 33b, and is threaded into a hole, which is formed on the internal conductor 32 implanted at the second end of that insulating support 31.

The depressed portions formed on the shield fitting 33 have, for example, a U-shaped cross-sectional shape. The second end of each insulating support 31 is inserted in the corresponding depressed portion in a perpendicular manner to the axis line.

The insulating member 5 is disposed on the inner surface of the shield fitting 33. Herein, in an identical manner to the first embodiment, the insulating members 5 provide slidable surfaces of contact with respect to the current-carrying conductor 10. Moreover, in the fifth embodiment, in order to maintain the shield fitting 33 and the current-carrying conductor 10 at the same electric potential, a contact 34 is attached to the shield fitting 33 with the fixing member 37, which is used to couple the shield member 33a to the shield member 33b.

In the fifth embodiment, the shield fitting 33 is configured with the shield members 33a and 33b that are, for example, the two divided component members. Hence, processing of the shield fitting 33 becomes easier and the installation structure of the contact 34 becomes simpler. Meanwhile, after inserting the second end of each insulating support 31 in the corresponding depressed portion which shape is U-shape in a perpendicular manner to the axis line, the second end and the shield member 33a can be coupled from the side surface.

Herein, the shield fitting 33 can also be configured with three or more component members. Besides, the other advantages achieved in the fifth embodiment are same as the advantages achieved in the first to fourth embodiments.

Sixth Embodiment

Figure 18:
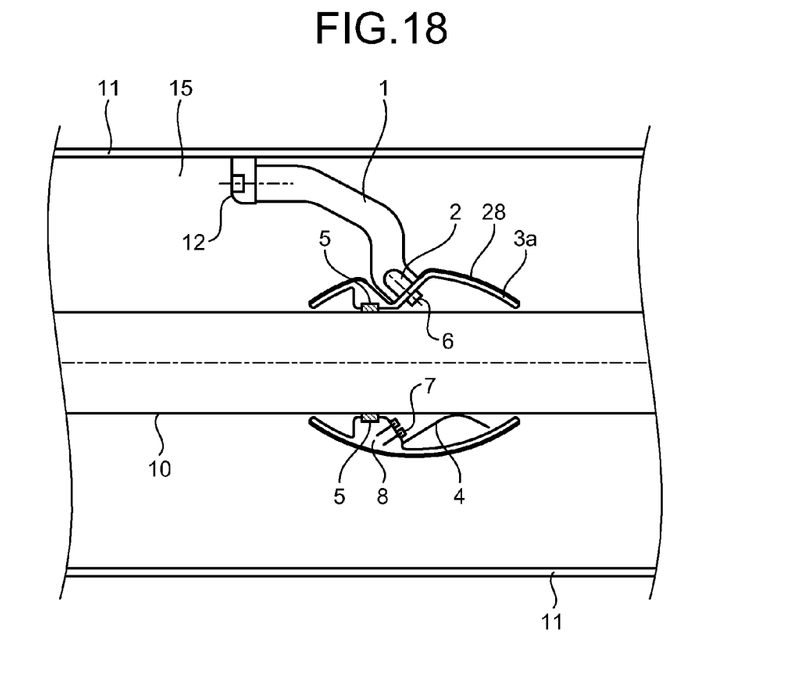
FIG. 18 is a diagram illustrating a vertical cross-sectional configuration of a gas-insulated bus according to a sixth embodiment and is a cross-sectional view along A-A line illustrated in FIG. 20.
Figure 19:
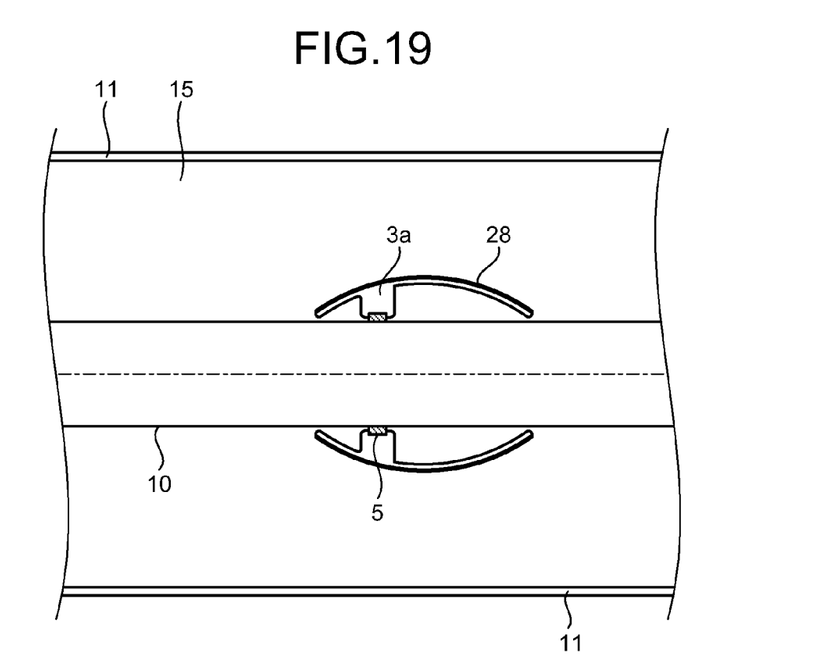
FIG. 19 is a diagram illustrating another vertical cross-sectional configuration of the gas-insulated bus according to the sixth embodiment and is a cross-sectional view along B-B line illustrated in FIG. 20.
Figure 20:
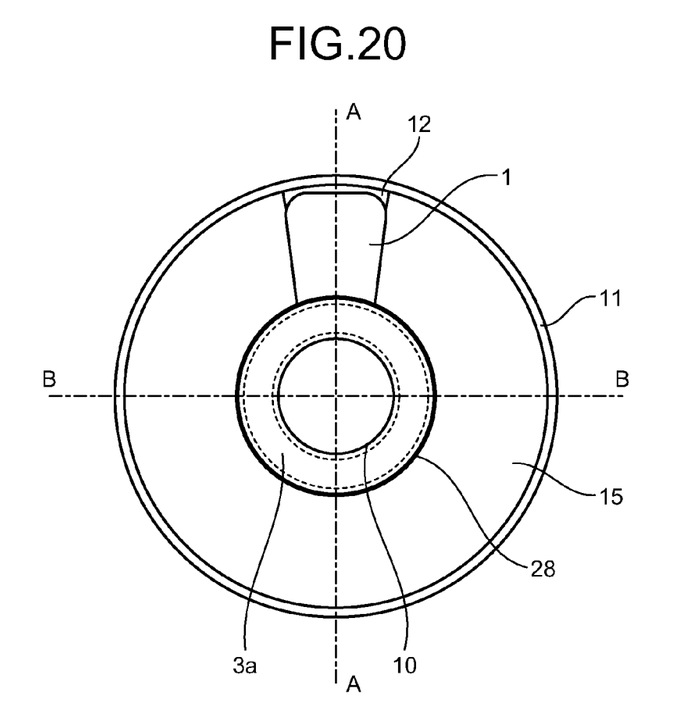
FIG. 20 is a diagram illustrating a horizontal cross-sectional configuration of the gas-insulated bus according to the sixth embodiment.

FIG. 18 is a diagram illustrating a vertical cross-sectional configuration of a gas-insulated bus according to a sixth embodiment and is a cross-sectional view along A-A line illustrated in FIG. 20. FIG. 19 is a diagram illustrating another vertical cross-sectional configuration of the gas-insulated bus according to the sixth embodiment and is a cross-sectional view along B-B line illustrated in FIG. 20. Herein, FIG. 20 is a diagram illustrating a horizontal cross-sectional configuration of the gas-insulated bus according to the sixth embodiment.

As illustrated in FIGS. 18 to 20, in the sixth embodiment, on the outer surface of the shield fitting 3a is applied an insulating film 28 coated with an insulator. Similarly, the insulator coating can also be performed with respect to each of the shield fittings 3b, 3c, 3d, and 33 according to the second to fifth embodiments, respectively. Meanwhile, in the sixth embodiment, the rest of the configuration is identical to the configuration according to the first embodiment. In FIGS. 18 to 20, the constituent elements identical to the constituent elements illustrated in FIGS. 1 to 3 are referred to by the same reference numerals and the explanation of such constituent elements is not repeated.

According to the sixth embodiment, since the outer surface of the shield fitting 3a is covered with the insulating film 28, it becomes possible to enhance the insulating capacity of the gas-insulated bus while reducing the insulating distance.

INDUSTRIAL APPLICABILITY

As described above, the gas-insulated bus according to the present invention can be suitably implemented at electric power plants or electric power substations.

REFERENCE SIGNS LIST 1, 21 INSULATING SUPPORT
2, 22 INTERNAL CONDUCTOR
3a to 3d, 3 SHIELD FITTING
4 CONTACT
5 INSULATING MEMBER
6 FIXING MEMBER
7 ATTACHING MEMBER
8 WALL
10 CURRENT-CARRYING CONDUCTOR
11 PRESSURE VESSEL
12 SEAT
15 INSULATING GAS
24 SIDE SURFACE
28 INSULATING FILM
51, 52 VIRTUAL SURFACE

The invention claimed is:

1. A gas-insulated bus comprising:
a current-carrying conductor disposed along an axial direction of a metallic container that is filled with an insulating gas;
a shield fitting through which passes the current-carrying conductor and that has a depressed portion formed on a portion of a barrel-shaped outer surface;
an insulating support that has a second end thereof fixed in the depressed portion of the shield fitting and has a first end thereof fixed to the metallic container, and that supports the current-carrying conductor via the shield fitting;
an internal conductor that is implanted in the second end of the insulating support and that, along with the second end, is positioned in the depressed portion and fixed to the shield fitting; and
a contact that is attached to an inner surface of the shield fitting, that is disposed in a space formed on an inside of the shield fitting, and that makes contact with the current-carrying conductor so as to maintain the shield fitting and the current-carrying conductor at the same electric potential, wherein
the internal conductor has such a shape that the internal conductor and the shield fitting together form a substantially barrel-like profile.

2. The gas-insulated bus according to claim 1, wherein
on the inner surface of the shield fitting, a ring-like insulating member is disposed along the circumferential direction of the current-carrying conductor, and
the ring-like insulating member is in slidable surface contact with the current-carrying conductor, the ring-like insulating member makes contact with the current-carrying conductor so as to support the current-carrying conductor.

3. The gas-insulated bus according to claim 2, wherein
in a plane including an axis line of the metallic container, a cross-sectional profile of the depressed portion has a substantially L-shape that is inclined with respect to an axis line, and
the second end is fixed to one of inclined surfaces of the depressed portion and is drawn in an inclined direction with respect to a surface perpendicular to the axis line.

4. The gas-insulated bus according to claim 2, wherein the shield fitting is configured by coupling together a plurality of divided component members.

5. The gas-insulated bus according to claim 1, wherein
in a plane including an axis line of the metallic container, a cross-sectional profile of the depressed portion has a substantially L-shape that is inclined with respect to an axis line, and
the second end is fixed to one of inclined surfaces of the depressed portion and is drawn in an inclined direction with respect to a surface perpendicular to the axis line.

6. The gas-insulated bus according to claim 1, wherein the shield fitting is configured by coupling together a plurality of divided component members.

7. The gas-insulated bus according to claim 6, wherein
in a plane including an axis line of the metallic container, a cross-sectional profile of the depressed portion has a substantially U-shape, and
the second end is fixed to one of side surfaces of the depressed portion and is drawn in a direction perpendicular to the axis line.

8. The gas-insulated bus according to claim 1, wherein the insulating support includes a plurality of the insulating supports, the plurality of insulating supports is fixed to the shield fitting and the current-carrying conductor is insulatingly supported by the plurality of insulating supports.

9. The gas-insulated bus according to claim 1, wherein an insulating film is applied on an outer surface of the shield fitting.

10. A gas-insulated bus comprising:
a current-carrying conductor disposed along an axial direction of a metallic container that is filled with an insulating gas;
a shield fitting through which passes the current-carrying conductor, that has a barrel-shaped outer surface, and that has a notch formed on a portion at an end;
an insulating support that has a second end thereof fixed to the shield fitting via the notch and has a first end thereof fixed to the metallic container, and that supports the current-carrying conductor via the shield fitting;
an internal conductor that is implanted in the second end of the insulating support and that, along with the second end, is positioned in the notch and fixed to the shield fitting; and
a contact that is attached to an inner surface of the shield fitting, that is disposed in a space formed on an inside of the shield fitting, and that makes contact with the current-carrying conductor so as to maintain the shield fitting and the current-carrying conductor at the same electric potential, wherein the internal conductor has such a shape that the internal conductor and the shield fitting together form a substantially barrel-like profile.

11. The gas-insulated bus according to claim 10, wherein on the inner surface of the shield fitting, a wall is formed along the circumferential direction of the current-carrying conductor, and the second end is fixed to a side surface of the wall and is drawn parallel to an axis line.

12. The gas-insulated bus according to claim 11, wherein at an inner circumferential surface of the wall, a ring-like insulating member is disposed along the circumferential direction of the current-carrying conductor, and the ring-like insulating member is in slidable surface contact with the current-carrying conductor, the ring-like insulating member makes contact with the current-carrying conductor so as to support the current-carrying conductor.

13. The gas-insulated bus according to claim 10, wherein at an inner circumferential surface of the wall, a ring-like insulating member is disposed along a circumferential direction of the current-carrying conductor, and the ring-like insulating member is in slidable surface contact with the current-carrying conductor, the ring-like insulating member makes contact with the current-carrying conductor so as to support the current-carrying conductor.

14. The gas-insulated bus according to claim 10, wherein the insulating support includes a plurality of the insulating supports, the plurality of insulating supports is fixed to the shield fitting and the current-carrying conductor is insulatingly supported by the plurality of insulating supports.

15. The gas-insulated bus according to claim 10, wherein an insulating film is applied on an outer surface of the shield fitting.

* * * * *